Aug. 12, 1924.

J. H. MILLER 1,504,573

SHUTTER OPERATING APPARATUS

Filed May 5, 1922   3 Sheets-Sheet 1

Inventor.
John H. Miller.
Williams Bradbury
McCaleb & Pierce Attys.

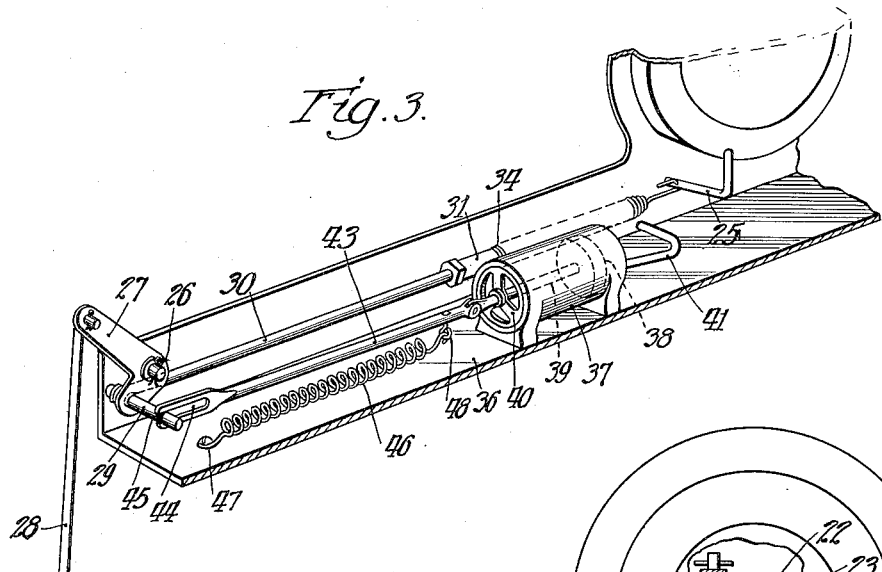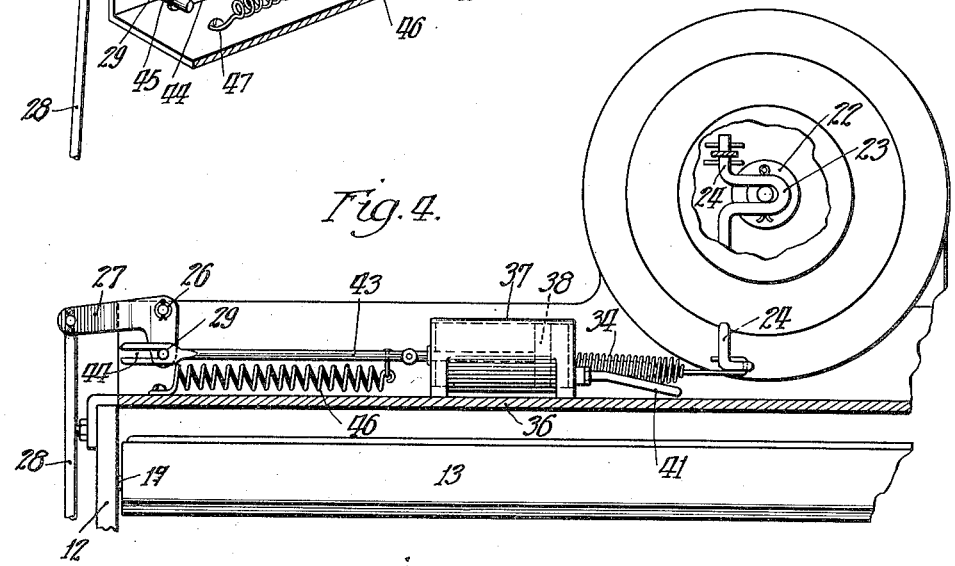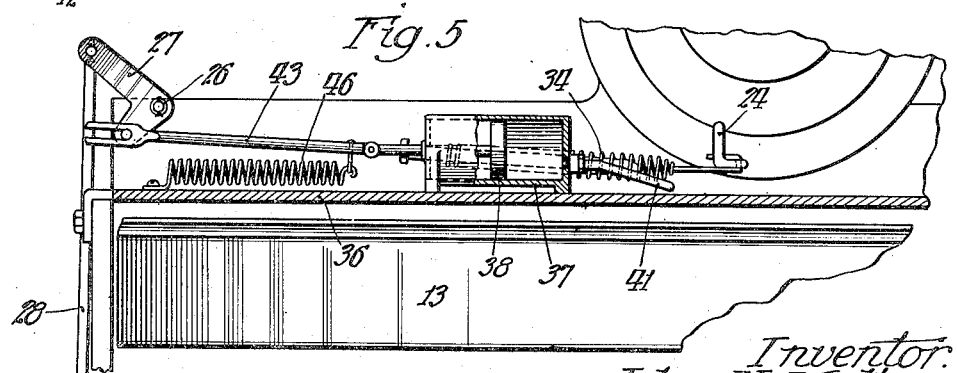

Aug. 12, 1924.
J. H. MILLER
1,504,573
SHUTTER OPERATING APPARATUS
Filed May 5, 1922
3 Sheets-Sheet 3
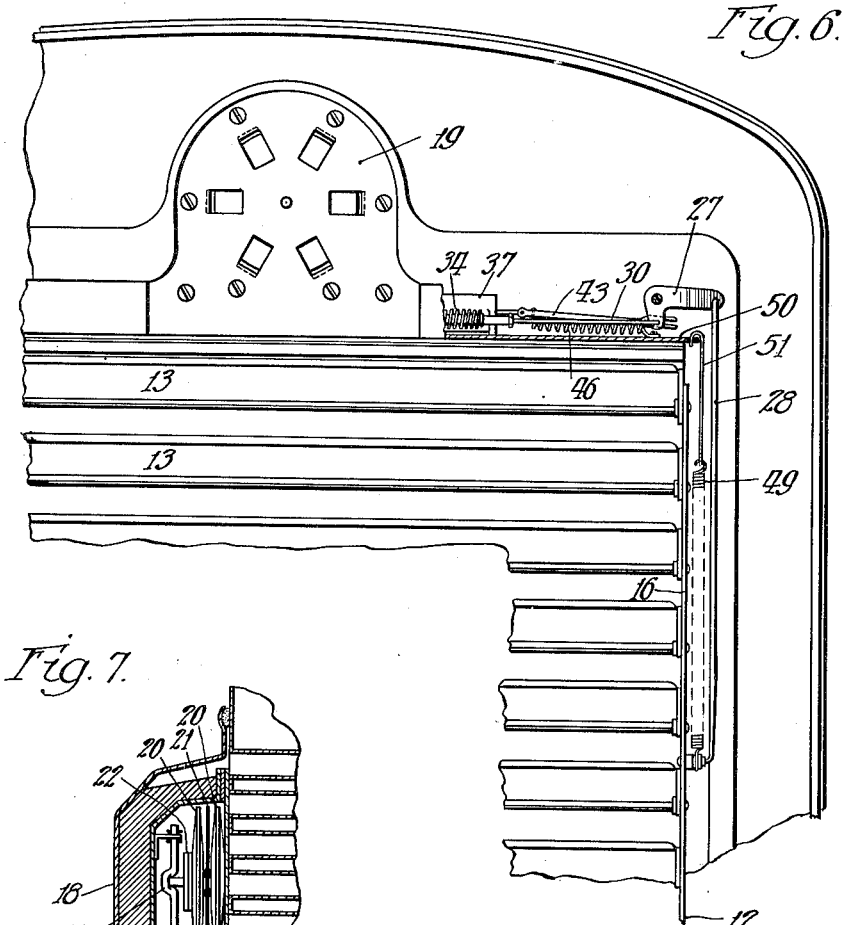
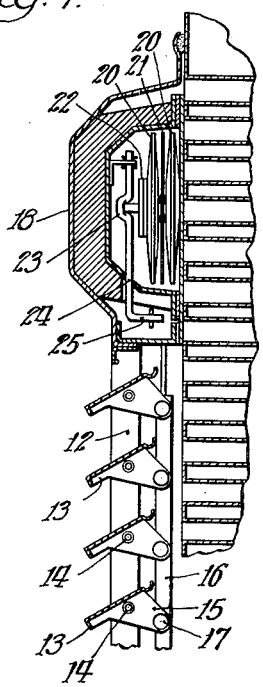
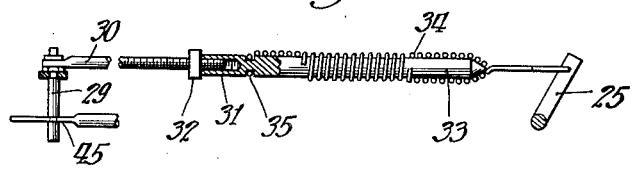
Inventor.
John H. Miller.
Williams Bradbury
McCaleb & Pirce, Attys.

Patented Aug. 12, 1924.

1,504,573

UNITED STATES PATENT OFFICE.

JOHN H. MILLER, OF OAK PARK, ILLINOIS, ASSIGNOR TO PINES MANUFACTURING COMPANY, OF CHICAGO, ILLINOIS, A CORPORATION OF DELAWARE.

SHUTTER-OPERATING APPARATUS.

Application filed May 5, 1922. Serial No. 558,842.

*To all whom it may concern:*

Be it known that I, JOHN H. MILLER, a citizen of the United States, and resident of Oak Park, in the county of Cook and State of Illinois, have invented certain new and useful Improvements in Shutter-Operating Apparatus, of which the following is a full, clear, concise, and exact description, reference being had to the accompanying drawings, forming a part of this specification.

This invention relates to winter fronts for automobiles, and particularly to means for automatically operating the shutters.

The principal feature of the invention is the means for automatically closing the shutters of a winter front of an automobile when the engine is stopped, regardless of the condition of the thermostat or other controlling device provided for normally operating the shutters.

When the engine of an automobile, provided with thermostatically controlled shutters, such as provided on the usual winter front for closing off the radiators, is stopped, it requires considerable time for the thermostatic controlling device to cool down sufficiently to entirely close the shutters, and if the machine is left standing for some time, the engine becomes very cold, thus interfering with its starting and operation when it is next started. It is, therefore, desirable to provide means in association with a winter front for an automobile for automatically closing the shutters, regardless of the condition of the thermostat, whenever the engine is stopped, and it is means of this character which applicant has provided by his present invention.

It is believed further disclosure of the invention will be best understood by a detailed description thereof taken in connection with the accompanying drawings, in which—

Figure 3 is a detached detail view of a portion of the thermostat and the shutter controlling mechanism with applicant's shutter closing means applied thereto. This view shows the condition of the operating mechanism as it is when the engine is running and cool.

Figure 4 is a view similar to Figure 3 but shows the condition of the mechanism when the engine is running and hot, that is, with the shutters open;

Figure 5 is another view similar to Figure 3 but shows the relation of the parts when the engine is not running but is hot, that is, with the shutters closed by the means herein provided, although the thermostat is still in such a condition as would normally tend to maintain the shutters open;

Figure 6 is a front view of a portion of the radiator and winter front with parts removed;

Figure 7 is a view substantially on the line 7—7 of Figure 1, and

Figure 8 is a detail view of the means employed for connecting the thermostatic device to the shutter operating lever.

Figure 1:
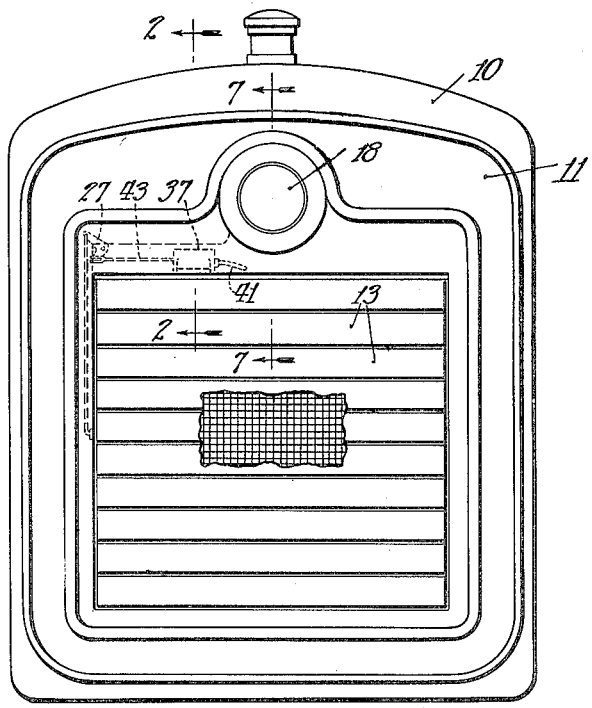
Figure 1 is a front view of an automobile radiator with a winter front thereon.

Referring now to the drawings, in which like reference characters refer to like parts throughout the several views, 10 is the usual radiator frame of the automobile to which is secured, in any desired manner, the shell 11 of the winter front. The shell 11 is cut away centrally thereof, the side supports 12 for the shutters 13 being mounted in the cut away portion. The shutters 13 are joined to the side members 12 by means of the pivots 14 and each has a rearwardly extending portion 15 which is pivotally joined to the common operating bar 16 by means of a lug or rivet 17.

The shell 11 near the upper edge thereof is provided with an outwardly dished portion 18 within which is located the thermostatic device. The thermostatic device consists of the plate 19 arranged in engagement with the radiator core and the expansible cells or sylphons 20 which are separated by the spacing member 21.

The follower 22 is arranged to maintain engagement with the outermost cell 20, and is joined to the offset portion 23 of the pivotally mounted shaft 24. The shaft 24 has a right angularly extending portion 25 which is rotated in a clockwise direction, as viewed from above, whenever the thermostat expands due to the engine becoming heated, and is permitted to rotate in a counter-clockwise direction as the thermostat contracts as the engine cools.

Pivotally supported on the lug 26 carried by the bracket member 36 fixed to shell 11 is a bell crank lever 27, one end of which is joined to the shutter operating bar 16 by means of the link 28. The other arm of the bell crank lever 27 has secured thereto, in any desired manner, the pin 29, to one end of which is pivotally secured the rod 30. Rod 30 has its screw threaded end, remote from the pin 29, received by the internally screw threaded sleeve 31, a lock nut 32 being provided to maintain the rod and sleeve in their adjusted position. Fixed to the sleeve 31 or integral therewith is a cylindrical core member 33 about which is positioned the spiral spring 34, one end of which is secured within the annular groove 35 in the member 33, the other end being joined to the right angularly extending portion 25 at the end of the thermostatically operated shaft 24. The part of the structure thus far described does not materially differ from devices which were known to applicant prior to his present invention, and, therefore, no claim to this part of the structure per se is made.

Figure 2:
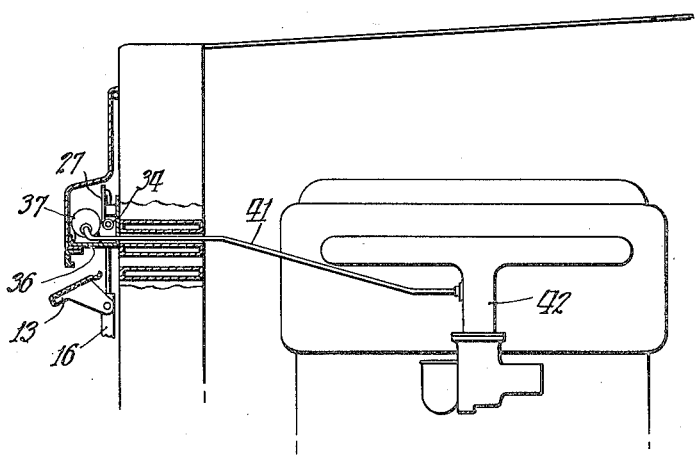
Figure 2 is a section substantially on the line 2—2 of Figure 1.

Secured to the bracket member 36 carried by the shell 11 is a cylinder 37 within which is the piston 38 secured to the end of the piston rod 39. The open end of the cylinder 37 is provided with a guide member 40 through which the piston rod 39 is adapted to reciprocate. The end of the cylinder 37 opposite to the guide member 40 communicates through the tube 41 with the intake manifold 42 of the engine. As shown in Figure 2, the tube 41 may be arranged to extend inwardly through the openings in the radiator.

The end of the piston rod 39, remote from the piston 38, is pivotally connected to one end of the rod 43, the other end of the rod 43 being provided with a bifurcation or slot 44, the opposite arms of which engage the annular groove 45 in the pin 29. A tension spring 46 has one end fixed to the stud 47 projecting from the bracket member 36, and the other end of the loop 48 secured to the rod 43. Thus, the spring 46 continually tends to move the piston member and parts associated therewith to the left, as seen in Figures 3, 4 and 5. A spring 49 is provided, one end of which is joined to the shutter operating bar 16, and the other to a fixed abutment 50 by means of the link 51. The spring 49 normally tends to raise the bar 16 and thus rotate the shutters 13 to their closed position. When, however, the thermostatic device is in its expanded condition and the rod 30 drawn to the right thereby, the bell crank lever 27 is rotated in a counterclockwise direction, as seen in Figures 3, 4 and 5, thus forcing the bar 16 downwardly against the tension of the spring 49 and opening the shutters.

The operation of the device of the present invention is as follows:

Assuming that the engine is cool and not running, the rod 30 and likewise rod 43 will have been moved to their left hand position, as viewed in Figures 3, 4 and 5. Thus the shutters will be closed. Assuming now that the engine is started, a partial vacuum will be created in the portion of the cylinder 37 to the right of piston 38 (Fig. 5), and the piston 38 will be drawn to the right to the position indicated in Figure 3, the slot 44 at the end of the rod 33 moving over the pin 29. As the engine continues to run, the thermostatic device will become heated up and expand, thus moving the rod 30 to the right and rotating the bell crank lever 27 in a counterclockwise direction until it occupies the position indicated in Figure 4, at which time the shutters will be opened. If now the engine is stopped, the suction will be removed from the tube 41 and the piston 38 and rod 43 will be moved to the left, by means of spring 46, to the position indicated in Figure 5, thus rotating the bell crank lever 27 in a clockwise direction and operating to close the shutters.

It should be noted that the springs 46 and 49 at this time both tend to close the shutters, and the combined force of these two springs is sufficiently great to close the shutters, notwithstanding the fact that the thermostat is in its expanded position, thus placing the spring 34 in its extended condition, as illustrated in Figure 5. If now the engine be again started before the thermostatic device has cooled, the suction operating on the piston 38 will again move the rod 43 to the right and permit the spring 34 to overcome the tension of the spring 49 and open the shutters. If, however, the engine has been permitted to stand sufficiently long so that the thermostat has become cooled to a point such that the shaft 24 has rotated to its normal position, upon starting the engine, the rod 43 will be moved to the right as before, but will not operate the bell crank lever 27, as the pin 29 will merely pass loosely along the slot 44. When, however, the thermostat operates and the rod 30 is moved to the right, the shutters will be opened, as previously explained.

While in the drawings and the above description, applicant has described his device as being suction operated, it is to be understood that this merely shows what he considers the preferred embodiment of his invention, and it is to be understood that he contemplates various modifications in the particular means employed. It is, of course, obvious that instead of a suction operated means, a fluid pressure operated means might equally well be employed. Also certain mechanically actuated devices, as centrifugal means, or a quick-acting thermostatic device or sylphon which may be associated with the exhaust, may be employed. Other means and modifications will readily present themselves to those skilled in the art. It is, therefore, to be understood that applicant's invention is to be limited merely by the scope of the appended claims.

Having now disclosed my invention, what I claim is new and desire to secure by Letters Patent of the United States is:

1. In combination, an internal combustion engine, a casing for said engine having an opening therein for admitting air to cool said engine, an adjustable closure for said opening, a thermostat adapted to adjust said closure, and pneumatically operated means actuated incident to the stopping of said engine for closing said closure.

2. In combination, an internal combustion engine, a casing or shell for said engine having an opening therein for admitting air to cool said engine, an adjustable closure for said opening, a thermostat mechanically connected with said closure and adapted to adjust the position thereof, and pneumatically operated means automatically actuated incident to stopping said engine for closing said closure.

3. In combination with an adjustable closure adapted to regulate the flow of air through an engine radiator, a thermostat connected with said closure and adapted automatically to position said closure to correspond with the cooling requirements of the engine when the latter is running, of means adapted when operative to close said closure in opposition to the action of said thermostat, and devices operable by the suction of the engine adapted to render the means last aforesaid inoperative when the engine is running.

4. In combination with an adjustable closure adapted to regulate the flow of air through an engine radiator, a thermostat, a yielding connection between the thermostat and said closure whereby the thermostat is adapted to adjust said closure in accordance with the cooling requirements of the engine when the latter is running, of means adapted when operative to close said closure in opposition to the action of said thermostat, and devices adapted automatically to render the means last aforesaid inoperative when and only when the engine is running, the said connection between the thermostat and closure being adapted to yield when the closure is closed in opposition to the action of said thermostat.

5. In combination, an engine, a casing or shell for said engine having an opening therein, an adjustable closure for said opening, heat controlled means for operating said closure, a cylinder, a piston therein, means operatively joining said piston to said closure, and a tube joining said cylinder to a manifold of said engine.

6. In combination, an internal combustion engine, a casing for said engine having an opening therein, an adjustable closure for said opening, a thermostat for operating said closure, a cylinder, a piston therein, means operatively joining said piston to said closure, and a tube joining said cylinder to the intake manifold of said engine.

7. In combination, an engine, a casing or shell for said engine having an opening therein, an adjustable closure for said opening, a thermostat for controlling said closure, resilient means joining said thermostat to said closure, a spring arranged to close said closure against the tension of said resilient means, and means actuated by said engine while in motion for automatically rendering said spring inoperative.

8. In combination, an internal combustion engine, a casing or shell for said engine having an opening therein, an adjustable closure for said opening, a thermostat, resilient means joining said thermostat to said closure, a cylinder, a piston therein, means joining said piston to said closure, a spring normally tending to maintain said piston in position to close said closure, and means operative while said engine is running to automatically move said piston to inoperative position against the tension of said spring.

9. In combination, an internal combustion engine, a casing or shell for said engine having an opening therein, an adjustable closure for said opening, a thermostat for controlling said closure, resilient means joining said thermostat to said closure, a spring normally tending to overcome said resilient means and maintain said closure in closed position, a cylinder, a piston therein, and a tube joining said cylinder to a manifold of said engine, said piston being arranged to render said spring inoperative while said engine is running.

10. In combination, an internal combustion engine, a casing or shell for said engine having an opening therein, an adjustable closure for said opening, a thermostat for controlling said closure, resilient means joining said thermostat to said closure, a cylinder, a piston therein, a loose connection between said piston and said closure, a spring normally tending to move said piston to a position to close said closure, and a tube joining said cylinder to the intake manifold of an engine, said piston being arranged to render said spring inoperative when moved to its alternative position.

In witness whereof, I hereunto subscribe my name this 20 day of April, 1922.

JOHN H. MILLER.

Witnesses:
DAGMAR PETERSON,
E. J. BOURGEOIS.